United States Patent
Suyama (10) Patent No.: US 12,148,950 B2
(45) Date of Patent: Nov. 19, 2024

(54) SEPARATOR FOR ZINC SECONDARY BATTERY

(71) Applicant: TOYOTA JIDOSHA KABUSHIKI KAISHA, Toyota (JP)

(72) Inventor: Hiroshi Suyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/405,575

(22) Filed: Jan. 5, 2024

(65) Prior Publication Data

US 2024/0145863 A1    May 2, 2024

Related U.S. Application Data (63) Continuation of application No. 17/554,694, filed on Dec. 17, 2021, now Pat. No. 12,034,179.

(30) Foreign Application Priority Data

Dec. 21, 2020    (JP) .................................. 2020-211224

(51) Int. Cl.
*H01M 50/434*    (2021.01)
*H01M 10/054*   (2010.01)
(Continued)

(52) U.S. Cl.
CPC ....... *H01M 50/434* (2021.01); *H01M 10/054* (2013.01); *H01M 50/417* (2021.01);
(Continued)

(58) Field of Classification Search
CPC ............. H01M 50/434; H01M 10/054; H01M 50/417; H01M 50/423; H01M 50/44;
(Continued)

(56) References Cited

U.S. PATENT DOCUMENTS 3,024,297 A1    4/2005   Davis et al.
2005/0079424 A1*   4/2005   Davis .................. H01M 50/457
                                                                 429/247
(Continued)

FOREIGN PATENT DOCUMENTS

EP      2272119 B1    4/2014
JP      2007-507850 A  3/2007
(Continued)

OTHER PUBLICATIONS

Feb. 16, 2023 Office Action issued in U.S. Appl. No. 17/554,694.
May 24, 2023 Office Action issued in U.S. Appl. No. 17/554,694.
Oct. 25, 2023 Office Action issued in U.S. Appl. No. 17/554,694.

*Primary Examiner* — Matthew T Martin
*Assistant Examiner* — Bartholomew A Hornsby
(74) *Attorney, Agent, or Firm* — Oliff PLC (57) ABSTRACT

The present disclosure provides a separator for a zinc secondary battery that can inhibit short circuiting in a zinc secondary battery. The separator for a zinc secondary battery of the disclosure has a porous substrate layer and a titanium oxide-containing porous layer laminated onto the porous substrate layer, wherein the titanium oxide-containing porous layer comprises a titanium oxide represented by $Ti_xO_y$, where $0<x$, $0<y$, and $y<2x$. The titanium oxide may be $TiO$, $Ti_2O$, $Ti_2O_3$, $Ti_3O$, $Ti_3O_5$, $Ti_4O_5$, $Ti_4O_7$, $Ti_5O_9$, $Ti_6O$, $Ti_6O_{11}$, $Ti_7O_{13}$, $Ti_8O_{15}$ or $Ti_9O_{17}$.

9 Claims, 5 Drawing Sheets

(51) Int. Cl.
*H01M 50/417* (2021.01)
*H01M 50/423* (2021.01)
*H01M 50/44* (2021.01)
*H01M 50/449* (2021.01)
*H01M 50/451* (2021.01)
*H01M 50/572* (2021.01)

(52) U.S. Cl.
CPC ......... *H01M 50/423* (2021.01); *H01M 50/44* (2021.01); *H01M 50/449* (2021.01); *H01M 50/451* (2021.01); *H01M 50/572* (2021.01)

(58) Field of Classification Search
CPC ............. H01M 50/449; H01M 50/451; H01M 50/572; H01M 2300/0014; H01M 4/244; Y02P 70/50
See application file for complete search history.

(56) References Cited

U.S. PATENT DOCUMENTS

| | | |
|---|---|---|
| 2013/0084474 A1 | 4/2013 | Mills |
| 2013/0244082 A1 | 9/2013 | Lee et al. |
| 2015/0056387 A1 | 2/2015 | Dadheech et al. |
| 2019/0190082 A1 | 6/2019 | Morooka et al. |
| 2019/0280523 A1 | 9/2019 | Horovitz et al. |
| 2020/0313137 A1 | 10/2020 | Takeuchi et al. |

FOREIGN PATENT DOCUMENTS

| | | |
|---|---|---|
| JP | 2016-146263 A | 8/2016 |
| JP | 2016-194990 A | 11/2016 |
| JP | 2019-216057 A | 12/2019 |

* cited by examiner

SEPARATOR FOR ZINC SECONDARY BATTERY

RELATED APPLICATIONS

The present application is a continuation application of U.S. application Ser. No. 17/554,694 filed Dec. 17, 2021, the entirety of which is incorporated herein by reference.

FIELD

The present disclosure relates to a separator for a zinc secondary battery.

BACKGROUND

In a zinc secondary battery such as a nickel zinc secondary battery or air zinc secondary battery, it is known that repeated charge-discharge causes the zinc in the negative electrode to form dendrites. Growth of the dendrites beyond the separator and reaching the positive electrode body can result in short circuiting of the zinc secondary battery. A need therefore exists for technology to inhibit short circuiting caused by growth of dendrites in zinc secondary batteries.

In regard to this problem, PTL 1 discloses a porous film situated between the positive electrode body and negative electrode body of a zinc battery, the porous film comprising a metal oxide having isoelectric points 5 to 11. The same publication mentions titanium dioxide, aluminum oxide and beryllium oxide as examples of metal oxides in the porous film.

CITATION LIST

Patent Literature

[PTL 1] Japanese Unexamined Patent Publication No. 2019-216057

SUMMARY

Technical Problem

In a zinc secondary battery, it is desirable to inhibit short circuiting caused by zinc dendrites grown from the negative electrode body reaching to the positive electrode body.

PTL 1 teaches that short circuiting can be inhibited by the porous film which it discloses. Further inhibition of short circuiting in zinc secondary batteries is desired, however.

It is an object of the present disclosure to provide a separator for a zinc secondary battery that can inhibit short circuiting in a zinc secondary battery.

Solution to Problem

The present inventors have found that the aforementioned object can be achieved by the following means:

<Aspect 1>
A separator for a zinc secondary battery,
having a porous substrate layer and a titanium oxide-containing porous layer laminated onto the porous substrate layer,
wherein the titanium oxide-containing porous layer comprises a titanium oxide represented by $Ti_xO_y$, where $0<x$, $0<y$, and $y<2x$.

<Aspect 2>
The separator for a zinc secondary battery according to aspect 1, wherein the titanium oxide is $TiO$, $Ti_2O$, $Ti_2O_3$, $Ti_3O$, $Ti_3O_5$, $Ti_4O_5$, $Ti_4O_7$, $Ti_5O_9$, $Ti_6O$, $Ti_6O_{11}$, $Ti_7O_{13}$, $Ti_8O_{15}$ or $Ti_9O_{17}$.

<Aspect 3>
The separator for a zinc secondary battery according to aspect 1 or 2, wherein the porous substrate layer, the titanium oxide-containing porous layer and the porous substrate layer are laminated in that order.

<Aspect 4>
The separator for a zinc secondary battery according to aspect 3, wherein a nonwoven fabric layer, the porous substrate layer, the titanium oxide-containing porous layer and the porous substrate layer are laminated in that order.

<Aspect 5>
The separator for a zinc secondary battery according to any one of aspects 1 to 4, wherein the porous substrate layer is a resin porous layer.

<Aspect 6>
The separator for a zinc secondary battery according to aspect 5, wherein the resin porous layer is a polyolefin-based porous layer, a polyamide-based porous layer or a nylon-based porous layer.

<Aspect 7>
A zinc secondary battery having a separator for a zinc secondary battery according to any one of aspects 1 to 6.

<Aspect 8>
The zinc secondary battery according to aspect 7, which has a negative electrode body, the separator for a zinc secondary battery and a positive electrode body in that order, and the negative electrode body, the separator for a zinc secondary battery and the positive electrode body are impregnated with an electrolyte solution.

<Aspect 9>
The zinc secondary battery according to aspect 8, wherein the electrolyte solution is an aqueous solution.

<Aspect 10>
The zinc secondary battery according to aspect 8 or 9, wherein the electrolyte solution is an alkali electrolyte solution.

<Aspect 11>
The zinc secondary battery according to any one of aspects 8 to 10, wherein zinc oxide is dissolved in the electrolyte solution.

Advantageous Effects of Invention

According to the present disclosure it is possible to provide a separator for a zinc secondary battery that can inhibit short circuiting in a zinc secondary battery.

DESCRIPTION OF EMBODIMENTS

Embodiments of the disclosure will now be described in detail. The disclosure is not limited to the embodiments described below, however, and various modifications may be implemented which do not depart from the gist thereof.
<Separator for Zinc Secondary Battery>

The separator for a zinc secondary battery according to the disclosure has a porous substrate layer, and a titanium oxide-containing porous layer laminated on the porous substrate layer. The titanium oxide-containing porous layer comprises a titanium oxide represented by $Ti_xO_y$, wherein $0<x$, $0<y$, and $y<2x$.

The zinc secondary battery to which the separator for a zinc secondary battery of the disclosure can be applied may be a zinc secondary battery having a negative electrode body, a separator and a positive electrode body housed in that order in a battery case, and having the battery case filled with an electrolyte solution. The zinc secondary battery in which the separator for a zinc secondary battery of the disclosure may be employed may be, more specifically, a nickel-zinc secondary battery, silver oxide-zinc secondary battery manganese oxide-zinc secondary battery or zinc-air secondary battery, or another type of alkali zinc secondary battery. The zinc secondary battery may be a battery that includes the following reaction at the negative electrode side, for example.

$$Zn + 4OH^- \rightarrow Zn(OH)_4^{2-} + 2e^-$$

Without being limited to any particular principle, it is thought that the following may be the principle which allows inhibition of short circuiting of the zinc secondary battery by the separator for a zinc secondary battery of the disclosure.

When charge-discharge is repeated in a zinc secondary battery, zinc dendrites grow from the negative electrode body and reach beyond the separator to the positive electrode body, thereby potentially causing short circuiting of the zinc secondary battery.

One reason for the growth of zinc dendrites is thought to be reduction of $Zn(OH)_4^{2-}$ in the electrolyte solution and uneven deposition of the resulting Zn on the negative electrode body. More specifically, for example, metallic zinc Zn reacts with hydroxide ion $OH^-$ at the negative electrode by discharge reaction, generating zinc hydroxide ($Zn(OH)_2$). Zinc hydroxide dissolves in the electrolyte solution, with dissolution of the zinc hydroxide in the electrolyte solution resulting in diffusion of tetrahydroxozincate ion ($[Zn(OH)_4]^{2-}$) in the electrolyte solution. When tetrahydroxozincate ion is reduced to zinc by charge reaction, this may promote formation of zinc in a non-homogeneous manner on the negative electrode. Therefore, inhibiting the supply of $Zn(OH)_4^{2-}$ to the zinc dendrites inhibits growth of the zinc dendrites and thereby presumably inhibits short circuiting of the zinc secondary battery.

Incidentally, $Zn(OH)_4^{2-}$ is generally produced during discharge on the negative electrode body side, but $Zn(OH)_4^{2-}$ is also produced on the positive electrode body side. This is thought to occur because of irregularities in the concentration of ZnO which dissolves in a fixed amount in the electrolyte solution during charge-discharge of a zinc secondary battery.

The separator for a zinc secondary battery of the disclosure has a titanium oxide-containing porous layer. The titanium oxide-containing porous layer comprises a titanium oxide represented by $Ti_xO_y$, wherein $0<x$, $0<y$, and $y<2x$.

A titanium oxide of this type has an electroconductive property. Consequently, after zinc dendrites grown from the negative electrode active material layer side have reached the titanium oxide-containing porous layer, current flowing through the zinc dendrites tends to diffuse in the in-plane direction of the layer. This tends to result in electrodeposition of zinc in the in-plane direction of the titanium oxide-containing porous layer. Growth of zinc dendrites to the positive electrode body side is therefore inhibited.

Such titanium oxides are also negatively electrified in strongly alkaline electrolytes. Consequently, $Zn(OH)_4^{2-}$ in the electrolyte, and especially $Zn(OH)_4^{2-}$ present on the positive electrode body side, is unlikely to approach the titanium oxide-containing porous layer due to electrostatic repulsion. This inhibits growth of zinc dendrites through the separator toward the positive electrode body side.

Figure 1:
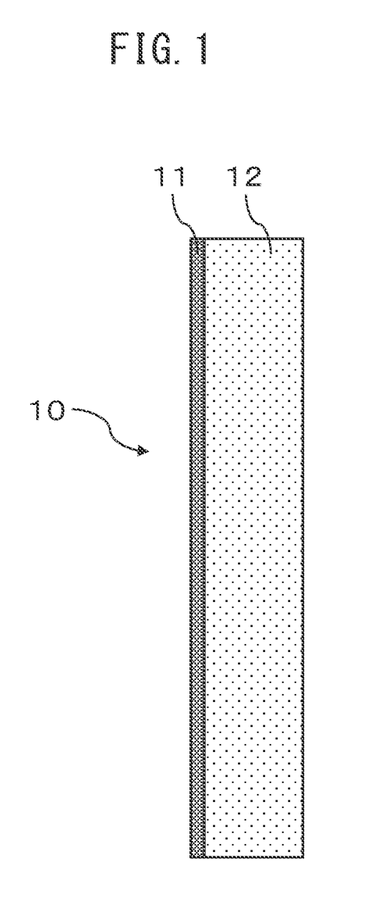
FIG. 1 is a schematic diagram showing a separator for a zinc secondary battery 10 according to a first embodiment of the disclosure.

FIG. 1 is a separator for a zinc secondary battery 10 according to a first embodiment of the disclosure.

As shown in FIG. 1, the separator for a zinc secondary battery 10 according to the first embodiment of the disclosure has a porous substrate layer 12, and a titanium oxide-containing porous layer 11 laminated on the porous substrate layer 12.

FIG. 1, however, is not intended to limit the scope of the separator for a zinc secondary battery of the disclosure.

The separator for a zinc secondary battery of the disclosure has a construction in which a porous substrate layer, a titanium oxide-containing porous layer, and a porous substrate layer are laminated in that order.

If the separator for a zinc secondary battery of the disclosure has such a construction it will be possible to inhibit sliding of the titanium oxide down from the titanium oxide-containing porous layer. This can improve the durability of the titanium oxide-containing porous layer. It can therefore also inhibit short circuiting of the zinc secondary battery. By disposing a porous substrate layer between the titanium oxide-containing porous layer and the positive electrode body it is possible to inhibit direct contact between the titanium oxide-containing porous layer and the positive electrode body.

Figure 2:
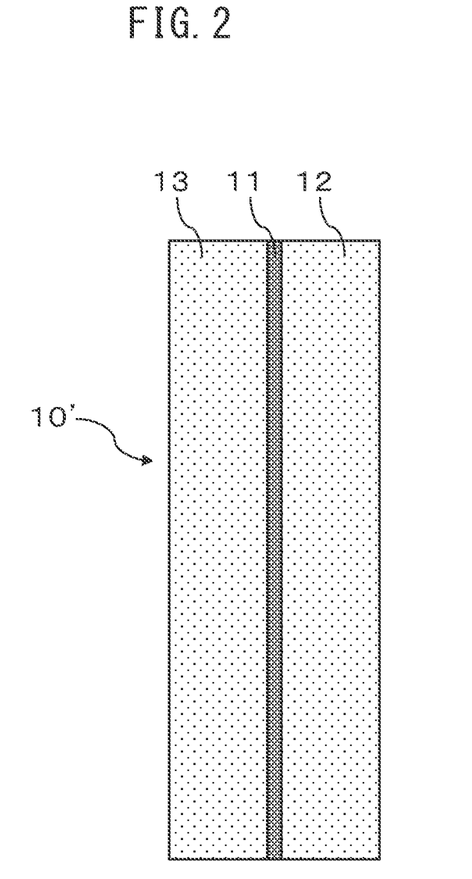
FIG. 2 is a schematic diagram showing a separator for a zinc secondary battery 10' according to a second embodiment of the disclosure.

FIG. 2 shows a separator for a zinc secondary battery 10' according to a second embodiment of the disclosure.

As seen in FIG. 2, the separator for a zinc secondary battery 10' according to the second embodiment of the disclosure has a porous substrate layer 13, a titanium oxide-containing porous layer 11, and a porous substrate layer 12, laminated in that order.

FIG. 2, however, is not intended to limit the scope of the separator for a zinc secondary battery of the disclosure.

The separator for a zinc secondary battery of the disclosure may also have a construction in which a nonwoven fabric layer, a porous substrate layer, a titanium oxide-containing porous layer and a porous substrate layer are laminated in that order.

If the separator for a zinc secondary battery of the disclosure has such a construction it will be possible to situate a nonwoven fabric layer between the negative electrode body and the porous substrate layer of the separator for a zinc secondary battery of the disclosure when the zinc secondary battery is constructed. This will help hold the electrolyte solution between the negative electrode body and the porous substrate layer. A separator for a zinc secondary battery of the disclosure having such a construction also can have increased distance between the negative electrode body surface on which zinc dendrites form, and the separator for a zinc secondary battery of the disclosure. This will reduce the surface areas of the tips of the zinc dendrites that have extended from the negative electrode body to the side of the separator for a zinc secondary battery of the disclosure. This reduces $Zn(OH)_4^{2-}$ supplied to the tips of zinc dendrites that have extended to the side of the separator for a zinc secondary battery of the disclosure. Extension of zinc dendrites is thus further inhibited.

Figure 3:
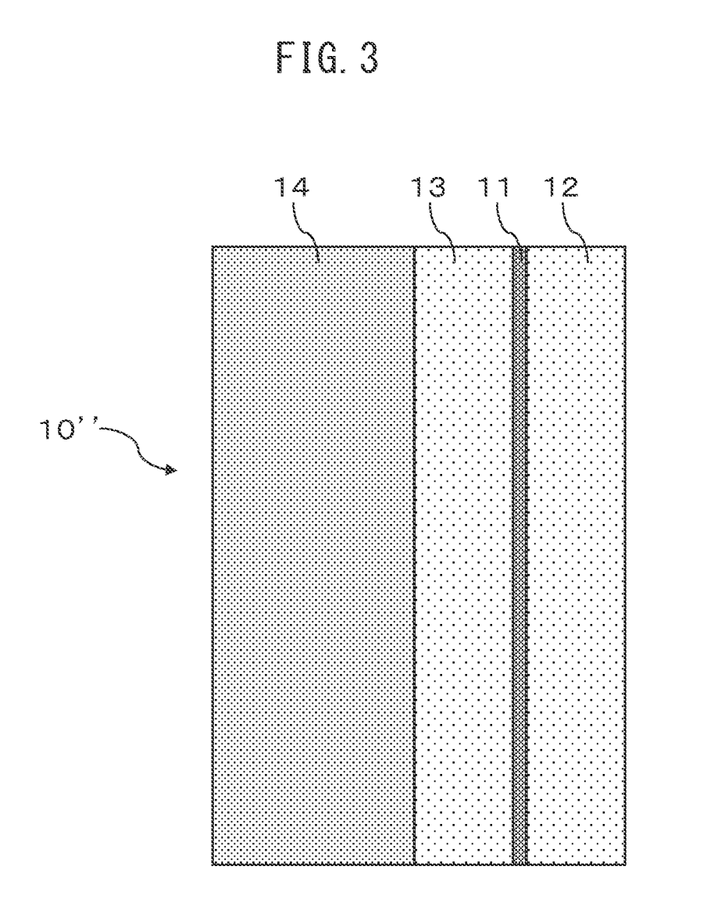
FIG. 3 is a schematic diagram showing a separator for a zinc secondary battery 10" according to a third embodiment of the disclosure.

FIG. 3 is a separator for a zinc secondary battery 10" according to a third embodiment of the disclosure.

As shown in FIG. 3, the separator for a zinc secondary battery 10" according to the third embodiment of the disclosure has a nonwoven fabric layer 14, a porous substrate layer 13, a titanium oxide-containing porous layer 11, and a porous substrate layer 12, laminated in that order.

FIG. 3, however, is not intended to limit the scope of the separator for a zinc secondary battery of the disclosure.

<Titanium Oxide-Containing Porous Layer>

The titanium oxide-containing porous layer is a porous layer comprising a titanium oxide. The titanium oxide may be present as particles in the titanium oxide porous layer.

The "porous" modifier in "titanium oxide porous layer" means that it has numerous through-holes running from the front to the back of the layer.

The thickness of the titanium oxide-containing porous layer may be 10 μm to 1000 μm, for example. The thickness of the titanium oxide-containing porous layer may be 10 μm or greater, 50 μm or greater or 100 μm or greater, and 1000 μm or smaller, 500 μm or smaller or 200 μm or smaller.

The porosity and mean pore size required for the titanium oxide-containing porous layer may be those commonly required for a separator for a zinc secondary battery.

The titanium oxide-containing porous layer can be formed by applying and drying a slurry of titanium oxide particles dispersed in a dispersing medium, on a porous layer such as the porous substrate layer described below. The method of applying the slurry onto the porous layer is not particularly restricted, and it may be a publicly known method such as screen printing, dipping or coating, and more specifically doctor blade coating, for example. The titanium oxide-containing porous layer may also be partially or fully integrated with the porous substrate layer.

The slurry may also comprise a binder such as styrene-butadiene-rubber (SBR) or a thickener such as carboxymethyl cellulose (CMC), in addition to the titanium oxide.

(Titanium Oxide)

The titanium oxide in the titanium oxide-containing porous layer is represented by $Ti_xO_y$, where $0<x$, $0<y$, and $y<2x$.

The valency of titanium in this type of titanium oxide is greater than 0.00 and less than 4.00. Such titanium oxides also have electroconductivity and are negatively electrified in electrolyte solutions.

The valency of titanium in the titanium oxide may be greater than 0.00, 0.50 or greater, 1.00 or greater, 2.00 or greater or 3.00 or greater, and less than 4.00, 3.80 or lower, 3.70 or lower, 3.60 or lower or 3.50 or lower.

Examples of titanium oxides in the titanium oxide-containing porous layer include $TiO$, $Ti_2O$, $Ti_2O_3$, $Ti_3O$, $Ti_3O_5$, $Ti_4O_5$, $Ti_4O_7$, $Ti_5O_9$, $Ti_6O$, $Ti_6O_{11}$, $Ti_7O_{13}$, $Ti_8O_{15}$ and $Ti_9O_{17}$, as well as their combinations, with no limitation to these.

When the titanium oxide-containing porous layer comprises titanium oxide particles, the mean primary particle size of the titanium oxide particles may be 10 nm to 1000 μm.

The mean primary particle size of the titanium oxide particles may be 10 nm or greater, 100 nm or greater, 10 μm or greater or 50 μm or greater, and 1000 μm or smaller, 500 μm or smaller, 250 μm or smaller or 100 μm or smaller.

The mean primary particle size of the titanium oxide particles can be determined as the circle equivalent diameter by observation with a scanning electron microscope (SEM). A large number of samples is preferred, the number being 20 or greater, 50 or greater or 100 or greater, for example.

The mean primary particle size of the titanium oxide particles can be appropriately determined by a person skilled in the art, according to the porosity and pore size required for the titanium oxide-containing porous layer. A larger mean primary particle size for the titanium oxide particles increases the porosity and pore size of the titanium oxide-containing porous layer, while a smaller mean primary particle size of the titanium oxide particles tends to lower the porosity and pore size of the titanium oxide-containing porous layer.

<Porous Substrate Layer>

The porous substrate layer is a porous layer having an insulating property and having through-holes running through both sides of the film. The porous substrate layer may be hydrophobic or hydrophilic.

The porosity rate and pore size of the porous substrate layer may be a porosity and pore size generally required for a separator for a zinc secondary battery.

The thickness of the porous substrate layer may be 10 μm to 1000 μm, for example. The thickness of the conductive porous substrate layer may be 10 μm or greater, 50 μm or greater or 100 μm or greater, and 1000 μm or smaller, 500 μm or smaller or 200 μm or smaller.

The porous substrate layer used may be a resin porous layer, and more specifically a polyolefin-based porous layer, polyamide-based porous layer or nylon-based porous layer, with no limitation to these.

The porous resin film may be hydrophilicized by adding a hydrophilic functional group, for example.

The "porous" modifier in "porous substrate layer" means that it has numerous through-holes running from the front to the back of the layer. The porous substrate layer may therefore be a sponge layer, for example.

<Nonwoven Fabric Layer>

The nonwoven fabric layer may be any nonwoven fabric layer that can be used as a constituent element of a separator layer in a zinc secondary battery. Examples of such nonwoven fabrics include cellulose-based nonwoven fabrics.

<Zinc Secondary Battery>

The zinc secondary battery of the disclosure has a separator for a zinc secondary battery of the disclosure.

The zinc secondary battery of the disclosure may have a publicly known construction, except for using a separator for a zinc secondary battery of the disclosure as the separator.

The zinc secondary battery of the disclosure may be a zinc secondary battery having a negative electrode body, a separator for a zinc secondary battery and a positive electrode body in that order, for example, with the negative electrode body, the separator for a zinc secondary battery and the positive electrode body being impregnated with an electrolyte solution.

Typically, the zinc secondary battery of the disclosure will be a zinc secondary battery having a negative electrode body, a separator and a positive electrode body housed in that order in a battery case, and having the battery case filled with an electrolyte solution. More specifically, the zinc secondary battery of the disclosure may be a nickel-zinc secondary battery, silver oxide-zinc secondary battery manganese oxide-zinc secondary battery, zinc-air secondary battery, or another type of alkali zinc secondary battery.

Figure 4:
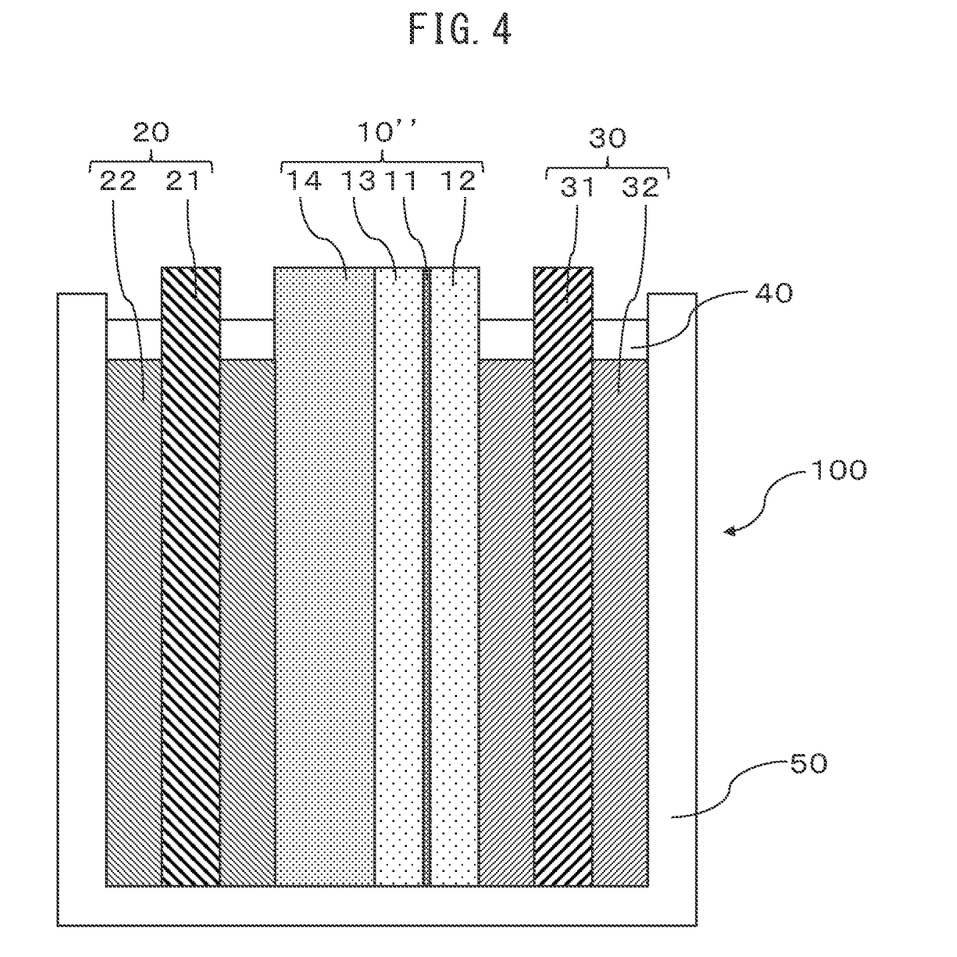
FIG. 4 is a schematic diagram showing a zinc secondary battery 100 according to a first embodiment of the disclosure.

FIG. 4 is a zinc secondary battery 100 according to a first embodiment of the disclosure.

As shown in FIG. 4, the zinc secondary battery 100 according to the first embodiment of the disclosure has a negative electrode body 20, a separator for a zinc secondary battery 10" according to the third embodiment of the disclosure, and a positive electrode body 30, laminated in that order. These are housed in a battery case 50 filled with an electrolyte solution 40.

Incidentally, the negative electrode body 20 has a construction in which a negative electrode active material layer 22 is formed on a negative electrode collector 21. The positive electrode body 30 has a construction in which a positive electrode active material layer 32 is formed on a positive electrode collector 31.

<Negative Electrode Body>

The negative electrode body may be one in which the surface of the negative electrode collector is covered by a zinc-based negative electrode active material layer.

The negative electrode collector may be a conductive material, for example, a metal such as stainless steel, aluminum, copper, nickel, iron or titanium, or carbon, with no limitation to these. The material of the negative electrode collector may be copper.

The form of the current collector layer is not particularly restricted and may be, for example, rod-shaped, foil-shaped, plate-shaped, mesh-like or porous. The collector may be metal Celmet.

The zinc-based negative electrode active material layer comprises zinc and zinc oxide, and an optional binder and other additives. The zinc-based negative electrode active material layer may further comprise a zinc compound such as calcium zincate, for example.

Examples of binders include, but are not limited to, styrene-butadiene-rubber (SBR).

<Separator for Zinc Secondary Battery>

The zinc secondary battery of the disclosure has a separator for a zinc secondary battery of the disclosure.

<Positive Electrode Body>

The positive electrode body may be one in which the surface of the positive electrode collector is covered by a positive electrode active material layer.

The description for the positive electrode collector is the same as for the negative electrode collector, substituting "positive electrode collector" for "negative electrode collector". The material of the positive electrode collector may be aluminum. If the material of the positive electrode collector is nickel, then the positive electrode collector may be nickel Celmet.

The positive electrode active material layer comprises a positive electrode active material, and optionally a binder and other additives. The positive electrode active material may be appropriately selected depending on the type of zinc secondary battery. When the zinc secondary battery is a nickel zinc secondary battery, for example, the positive electrode active material may comprise nickel hydroxide and/or nickel oxyhydroxide.

For the binder, refer to the description of the negative electrode body.

<Electrolyte Solution>

The electrolyte solution may be an aqueous solution, and more specifically an alkali electrolyte solution. The alkali electrolyte solution may be an electrolyte solution comprising an alkali metal hydroxide, and more specifically potassium hydroxide, sodium hydroxide, lithium hydroxide or ammonium hydroxide. The electrolyte solution is preferably potassium hydroxide. Other inorganic or organic additives may also be present in the electrolyte solution.

Zinc oxide may also be dissolved in the electrolyte solution. The zinc oxide may be dissolved in the electrolyte solution in a state of saturation at ordinary temperature.

EXAMPLES

Example 1

A separator for a zinc secondary battery was prepared for Example 1 in the following manner.
(Preparation of Ink)

TiO powder as titanium oxide particles, styrene-butadiene-rubber (SBR) and carboxymethyl cellulose (CMC) were weighed out to a mass ratio of TiO powder:SBR:CMC=97:2.5:0.5 in the titanium oxide-containing porous layer to be formed, and a total of 2 g.

The TiO powder and CMC were placed in a mortar and kneaded. The kneaded material was then placed in a container and stirred at 2000 rpm for 1 minute with an Awatori Rentaro (product of Thinky Corp.). SBR was then added to the kneaded material, and the mixture was stirred at 2000 rpm for 3 minutes with an Awatori Rentaro (product of Thinky Corp.) to prepare an ink.
(Formation of Intermediate Layer)

A polypropylene (PP) separator as the porous substrate layer was attached onto a glass panel with masking tape, while being pulled with application of slight tensile force from both ends in the longitudinal direction. The PP separator was subjected to prior hydrophilicizing treatment.

The ink was coated onto the surface of the PP separator by doctor blade coating. The blade gap was 125 μm. The coated ink was then allowed to naturally dry, and then further dried at 40° C. for 10 hours with a vacuum drier. This formed a TiO-containing porous layer as an intermediate layer on the PP separator.
(Separator Assembly)

A separate hydrophilicized PP separator was disposed on the TiO-containing porous layer, and then a hydrophilicized cellulose-based nonwoven fabric separator was disposed over this to prepare a separator for Example 1.

The separator of Example 1 had a construction with the cellulose-based nonwoven fabric separator, PP separator, TiO-containing porous layer and PP separator stacked in that order.

Example 2

A separator for Example 2 was prepared in the same manner as Example 1, except that $Ti_2O_3$ powder was used instead of TiO powder.

The separator of Example 2 had a construction with the cellulose-based nonwoven fabric separator, PP separator, $Ti_2O_3$-containing porous layer and PP separator stacked in that order.

Comparative Example 1

A separator for Comparative Example 1 was prepared in the same manner as Example 1, except that an intermediate layer was not formed on the PP separator.

The separator of Comparative Example 1 had a construction with the cellulose-based nonwoven fabric separator, PP separator and PP separator stacked in that order.

Comparative Example 2

A separator for Comparative Example 2 was prepared in the same manner as Example 1, except that Ti powder was used instead of TiO powder.

The separator of Comparative Example 2 had a construction with the cellulose-based nonwoven fabric separator, PP separator, Ti-containing porous layer and PP separator stacked in that order.

Comparative Example 3

A separator for Comparative Example 3 was prepared in the same manner as Example 1, except that $TiO_2$ powder was used instead of TiO powder.

The separator of Comparative Example 3 had a construction with the cellulose-based nonwoven fabric separator, PP separator, $TiO_2$-containing porous layer and PP separator stacked in that order.

Comparative Example 4

A separator for Comparative Example 4 was prepared in the same manner as Example 1, except that Cu—Sn alloy powder was used instead of TiO powder.

The separator of Comparative Example 4 had a construction with the cellulose-based nonwoven fabric separator, PP separator, Cu—Sn alloy-containing porous layer and PP separator stacked in that order.

Comparative Example 5

A separator for Comparative Example 5 was prepared in the same manner as Example 1, except that TiN powder was used instead of TiO powder.

The separator of Comparative Example 5 had a construction with the cellulose-based nonwoven fabric separator, PP separator, TiN-containing porous layer and PP separator stacked in that order.

Comparative Example 6

A separator for Comparative Example 6 was prepared in the same manner as Example 1, except that $TiB_2$ powder was used instead of TiO powder.

The separator of Comparative Example 6 had a construction with the cellulose-based nonwoven fabric separator, PP separator, $TiB_2$-containing porous layer and PP separator stacked in that order.

Comparative Example 7

A separator for Comparative Example 7 was prepared in the same manner as Example 1, except that ZrC powder was used instead of TiO powder.

The separator of Comparative Example 7 had a construction with the cellulose-based nonwoven fabric separator, PP separator, ZrC-containing porous layer and PP separator stacked in that order.

Comparative Example 8

A separator for Comparative Example 8 was prepared in the same manner as Example 1, except that TiC powder was used instead of TiO powder.

The separator of Comparative Example 8 had a construction with the cellulose-based nonwoven fabric separator, PP separator, TiC-containing porous layer and PP separator stacked in that order.

<Fabrication of Zinc Secondary Battery>

Nickel zinc secondary batteries employing different separators were fabricated in the following manner.

(Positive Electrode Body)

$Ni(OH)_2$, SBR and CMC were each weighed out to a mass ratio of $Ni(OH)_2$:SBR:CMC=97:2.5:0.5. The $Ni(OH)_2$ included an auxiliary agent.

The materials were kneaded with a mortar, water was added to adjust the hardness, and the mixture was stirred for 1 minute at 2000 rpm using an Awatori Rentaro (product of Thinky Corp.) to prepare a positive electrode active material slurry.

The positive electrode active material slurry was coated by doctor blade coating onto the surface of a nickel foil as a positive electrode collector. The coated positive electrode active material slurry was then allowed to naturally dry, and further dried at 80° C. overnight in a reduced pressure environment. A positive electrode body was thus formed.

(Negative Electrode Body)

ZnO, Zn, SBR and CMC were each weighed out to a mass ratio of ZnO:Zn:SBR:CMC=76:21:2.5:0.5.

The materials were kneaded with a mortar, water was added to adjust the hardness, and the mixture was stirred for 1 minute at 2000 rpm using an Awatori Rentaro (product of Thinky Corp.) to prepare a negative electrode active material slurry.

The negative electrode active material slurry was coated by doctor blade coating onto the surface of a copper foil as a negative electrode collector. The coated negative electrode active material slurry was then allowed to naturally dry, and further dried at 80° C. overnight in a reduced pressure environment. A negative electrode body was thus formed.

(Assembly of Zinc Secondary Battery)

The positive electrode body, separator and negative electrode body were laminated in that order and housed in a battery case. The battery case was then filled with an electrolyte solution to obtain a zinc secondary battery. The separator was disposed with the nonwoven fabric layer facing the negative electrode body side. The electrolyte solution was a 6 mol/L KOH aqueous solution with ZnO dissolved in a state of saturation at 25° C.

<Cycle Stability Evaluation>

A cycle test was carried out for each of the nickel zinc secondary batteries employing different examples of separators, and the number of cycles to short circuiting was measured.

The cycle test was conducted using an electrochemical measurement system (VMP3, product of Bio-Logic) and a thermostatic bath (SU-642, product of Espec Corp.). The temperature of each nickel zinc secondary battery during the measurement was 25° C.

The cycle test was carried out with a charge-discharge range of 0% to 50% state of charge (SOC), with the theoretical charge capacity of the positive electrode active material layer as 100%. The C rate was 3.5 $mA/cm^2$. The cut voltage was 2 V during charge and 1.3 V during discharge. The cycle test was carried out with an interval of 5 minutes between each cycle.

<Results>

Figure 5:
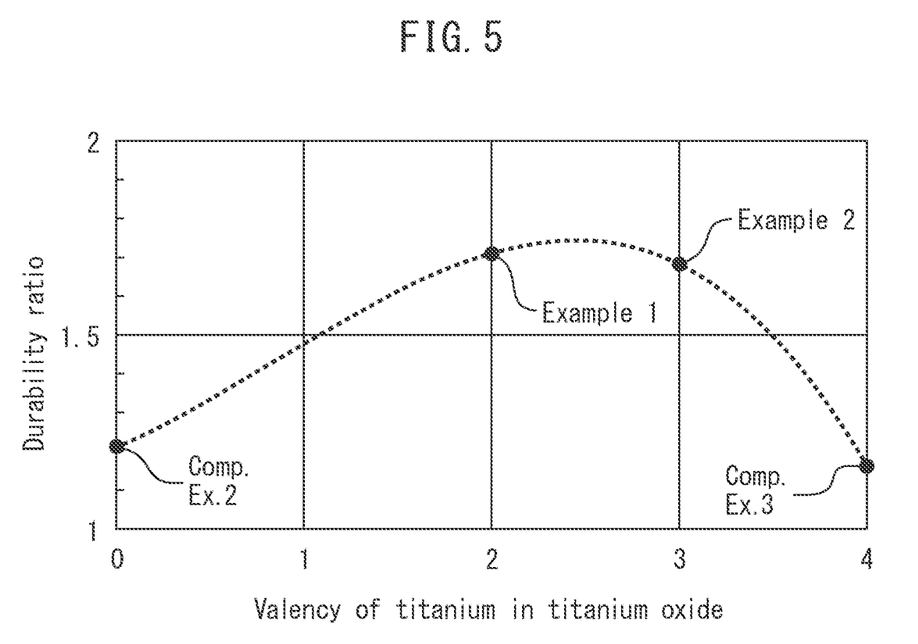
FIG. 5 is a graph showing evaluation results for cycle stability in Comparative Examples 2 and 3 and Examples 1 and 2.

The construction of the separator and the cycle stability evaluation results for each example are shown in Table 1. FIG. 5 is a graph showing evaluation results for cycle stability in Comparative Examples 2 and 3 and Examples 1 and 2. In Table 1, the cycle stability evaluation results are listed with the number of cycles to short circuiting in Comparative Example 1 as 100%. The valency of Ti is only listed for Comparative Examples 2 and 3 and Examples 1 and 2. In FIG. 5, the ordinate shows the ratio of the durability in each example with respect to the durability in Comparative Example 1, and the abscissa shows the valency of titanium.

TABLE 1

| Example | Construction | | | | Titanium valency | Result Durability (%) |
|---|---|---|---|---|---|---|
| | Porous substrate layer | Intermediate layer | Porous substrate layer | Nonwoven fabric layer | | |
| Comp. Ex. 1 | PP porous layer | None | PP porous layer | Cellulose nonwoven fabric layer | — | 100 |
| Comp. Ex. 2 | PP porous layer | Ti-containing porous layer | PP porous layer | Cellulose nonwoven fabric layer | 0 | 121 |
| Example 1 | PP porous layer | TiO-containing porous layer | PP porous layer | Cellulose nonwoven fabric layer | 2 | 171 |
| Example 2 | PP porous layer | $Ti_2O_3$-containing porous layer | PP porous layer | Cellulose nonwoven fabric layer | 3 | 168 |
| Comp. Ex. 3 | PP porous layer | $TiO_2$-containing porous layer | PP porous layer | Cellulose nonwoven fabric layer | 4 | 116 |
| Comp. Ex. 4 | PP porous layer | Cu—Sn alloy-containing porous layer | PP porous layer | Cellulose nonwoven fabric layer | — | 96 |
| Comp. Ex. 5 | PP porous layer | TiN-containing porous layer | PP porous layer | Cellulose nonwoven fabric layer | — | 57 |
| Comp. Ex. 6 | PP porous layer | $TiB_2$-containing porous layer | PP porous layer | Cellulose nonwoven fabric layer | — | 24 |
| Comp. Ex. 7 | PP porous layer | ZrC-containing porous layer | PP porous layer | Cellulose nonwoven fabric layer | — | 64 |
| Comp. Ex. 8 | PP porous layer | TiC-containing porous layer | PP porous layer | Cellulose nonwoven fabric layer | — | 45 |

As shown in Table 1 and FIG. 5, the durability was 171% in Example 1 which employed a TiO-containing porous layer as the intermediate layer, which was significantly higher durability compared to Comparative Example 1 which did not have an intermediate layer. The durability was 168% even in Example 2 which employed a $Ti_2O_3$-containing porous layer as the intermediate layer, which was likewise significantly higher durability compared to Comparative Example 1 which did not have an intermediate layer.

In contrast, in Comparative Example 2 which employed a Ti-containing porous layer and Comparative Example 3 which employed a $TiO_2$-containing porous layer as the intermediate layer, the durability values were 121% and 116%, respectively, which was slightly higher durability compared to Comparative Example 1 which did not have an intermediate layer. However, the degree of increase in durability in Comparative Examples 2 and 3 was less than in Examples 1 and 2.

In Comparative Examples 4 to 8 which employed porous layers containing metals other than titanium or titanium oxides, the durability values were 96%, 57%, 24%, 64% and 45%, in that order, and therefore all had lower durability than Comparative Example 1 which did not have an intermediate layer.

REFERENCE SIGNS LIST 10, 10', 10" Separator
11 Titanium oxide-containing porous layer
12, 13 Porous substrate layer
14 Nonwoven fabric layer
20 Negative electrode body
21 Negative electrode collector
22 Negative electrode active material layer
30 Positive electrode body
31 Positive electrode collector
32 Positive electrode active material layer
40 Electrolyte solution
50 Battery case
100 Zinc secondary battery

What is claimed is:

1. A method for assembling a zinc secondary battery, wherein the zinc secondary battery comprises a negative electrode body, a separator for the zinc secondary battery, wherein the separator comprises at least one porous substrate layer and a titanium oxide-containing porous layer laminated onto the porous substrate layer, and wherein the titanium oxide-containing porous layer comprises a titanium oxide represented by Ti2O, Ti2O3, Ti3O, Ti3O5, Ti4O5, Ti6O, Ti6O11, Ti7O3, Ti8O15 or Ti9O17, and a positive electrode body, in that order, wherein the negative electrode body, the separator and the positive electrode body are impregnated with an electrolyte solution, and wherein the method comprises laminating the positive electrode body, the separator and the negative electrode body in this order to form a stack housing the stack in a battery case, and filling the battery case with the electrolyte solution.

2. The method according to claim 1 to wherein the separator includes a first porous substrate layer and a second porous substrate layer, and wherein the first porous substrate layer, the titanium oxide-containing porous layer and the second porous substrate layer are laminated in that order.

3. The method according to claim 2 to wherein the separator further includes a nonwoven fabric layer laminated on one of the first porous substrate layer and the second porous substrate layer on a side thereof opposite a side laminated to the titanium oxide-containing porous layer.

4. The method according to claim 1, wherein the at least one porous substrate layer is a resin porous layer.

5. The method according to claim 4, wherein the resin porous layer is a polyolefin-based porous layer, a polyamide-based porous layer or a nylon-based porous layer.

6. The method according to claim 1, wherein the electrolyte solution is an aqueous solution.

7. The method according to claim 1, wherein the electrolyte solution is an alkali electrolyte solution.

8. The method according to claim 1, wherein zinc oxide is dissolved in the electrolyte solution.

9. The method according to claim 1, wherein the titanium oxide-containing porous layer is comprised of titanium oxide particles.

* * * * *